United States Patent [19]
Aldridge et al.

[11] Patent Number: 5,488,531
[45] Date of Patent: Jan. 30, 1996

[54] REDUNDANT POWER MIXING ELEMENT WITH FAULT DETECTION FOR DC-TO-DC CONVERTER

[75] Inventors: David L. Aldridge, Dripping Springs; Stephen R. Bissell; Daniel D. Gunn, both of Austin, all of Tex.

[73] Assignee: Tandem Computers Incorporated, Cupertino, Calif.

[21] Appl. No.: 268,918

[22] Filed: Jun. 30, 1994

[51] Int. Cl.$^6$ .................................. H02J 1/04; H02H 7/10
[52] U.S. Cl. .................................. 361/18; 363/65; 363/89
[58] Field of Search .................................. 363/13–15, 34, 363/65, 89; 307/48, 43

[56] References Cited

U.S. PATENT DOCUMENTS

| | | | |
|---|---|---|---|
| 3,191,095 | 6/1965 | Hefti | 361/88 |
| 5,019,717 | 5/1991 | McCurry et al. | 307/66 |

*Primary Examiner*—A. D. Pellinen
*Assistant Examiner*—Michael J. Sherry
*Attorney, Agent, or Firm*—Townsend and Townsend and Crew

[57] ABSTRACT

A power mixing apparatus for mixing current from a first and a second power rail includes a first enabling circuit to provide a first enabling signal, a second enabling circuit to provide a second enabling signal, a first inrush limiter to output a first current in response to the first enabling signal, a second inrush limiter to output a second current in response to the second enabling signal, a first open-circuiting circuit to decouple the first enabling circuit from the first inrush limiter when the first open-circuiting circuit is open-circuited, a second open-circuiting circuit to decouple the second enabling circuit from the second inrush limiter when the second open-circuiting circuit is open-circuited, a first isolation circuit to isolate the first inrush limiter from the second current, a second isolation circuit to isolate the second inrush limiter from the first current, and a direct-current converter to convert the first and the second current in response to the first enabling signal and in response to the second enabling signal.

21 Claims, 3 Drawing Sheets

5,488,531

REDUNDANT POWER MIXING ELEMENT WITH FAULT DETECTION FOR DC-TO-DC CONVERTER

CROSS-REFERENCES TO RELATED APPLICATIONS

This application is also related to application Ser. No. 08/268,699, filed Jun. 30, 1994, entitled "A System for Switching Power and Scrubbing Power Mixing Devices for Faults."

BACKGROUND OF THE INVENTION

1. Field of the Invention

The present invention relates generally to mixing of power supplied by multiple power supplies.

2. Description of the Related Art

Fault tolerant computer systems are commonly designed such that component failures occurring in one area of the system are prevented from affecting the remaining areas of the system. Further, fault tolerant computer systems are typically designed to continue operations and maintain data integrity even when a faulty component is being serviced.

Some fault tolerant computer system designs have previously incorporated uninterruptable power supplies (UPSs) to provide the computer system with operating power in the case of a general power outage. UPSs are used externally between the computer system and the general wall power supply, and multiple bulk power supplies are used internally between the UPS and the computer hardware. Having redundant power supplies and power lines ensures that if one bulk power supply is defective, the computer can continue operate from power supplied from another bulk power supply.

In many cases the hardware of a fault tolerant computer system is designed so that when a failure is encountered the user can replace the defective hardware without having to shut the system down, or to call computer service personnel. Replaceable computer hardware are referred to as customer replaceable units (CRUs) or logic units (LU) generally. One problem with allowing customers to replace CRUs is that power to the CRU is often still flowing or "hot" while the computer system is operating. If a CRU is still powered when it is physically removed from the computer housing, damage to the unit, the power supplies, or to other CRUs is possible due, for example, to power surges or electrical arcing across pin connection.

SUMMARY OF THE INVENTION

The present invention relates to a power mixing apparatus. Specifically, the present invention discloses a power mixing apparatus enabling switching of power source input from alternative power supplies and protecting other portions of the LU circuitry from power transients and other power fluctuations, such as "hot" removal of the LU.

According to a preferred embodiment of the invention, a power mixing apparatus includes a first and second enabling circuit for producing a first and a second enabling signal to select whether power is supplied from a first and/or second power supply, respectively; a first and second inrush limiter for limiting the time rate of change of current flowing from the first and second power supplies to a direct-current converter, in response to the first and second enabling signals, respectively; a first open-circuiting circuit for coupling the first inrush limiter and the direct-current converter to the first enabling circuit, when the first open-circuiting circuit is coupled to a first pair of shorting pins; a second open-circuiting circuit for coupling the second inrush limiter and the direct-current converter to the second enabling circuit, when the second open-circuiting circuit is coupled to a second pair of shorting pins; wherein the first and second pair of shorting pins are coupled to the first and the second open-circuiting circuits, respectively, only when the LU is fully inserted into a computer housing.

According to a further embodiment of the present invention, the first and second inrush limiters include metal oxide silicon field effect transistors, the first and second open-circuiting circuit are opto-isolators, and the first and second pair of shorting pins are a short-circuit connection.

Further understanding of the nature and advantages of the invention may be realized by reference to the remaining portions of the specification and Drawings.

DESCRIPTION OF THE PREFERRED EMBODIMENT

Figure 1:
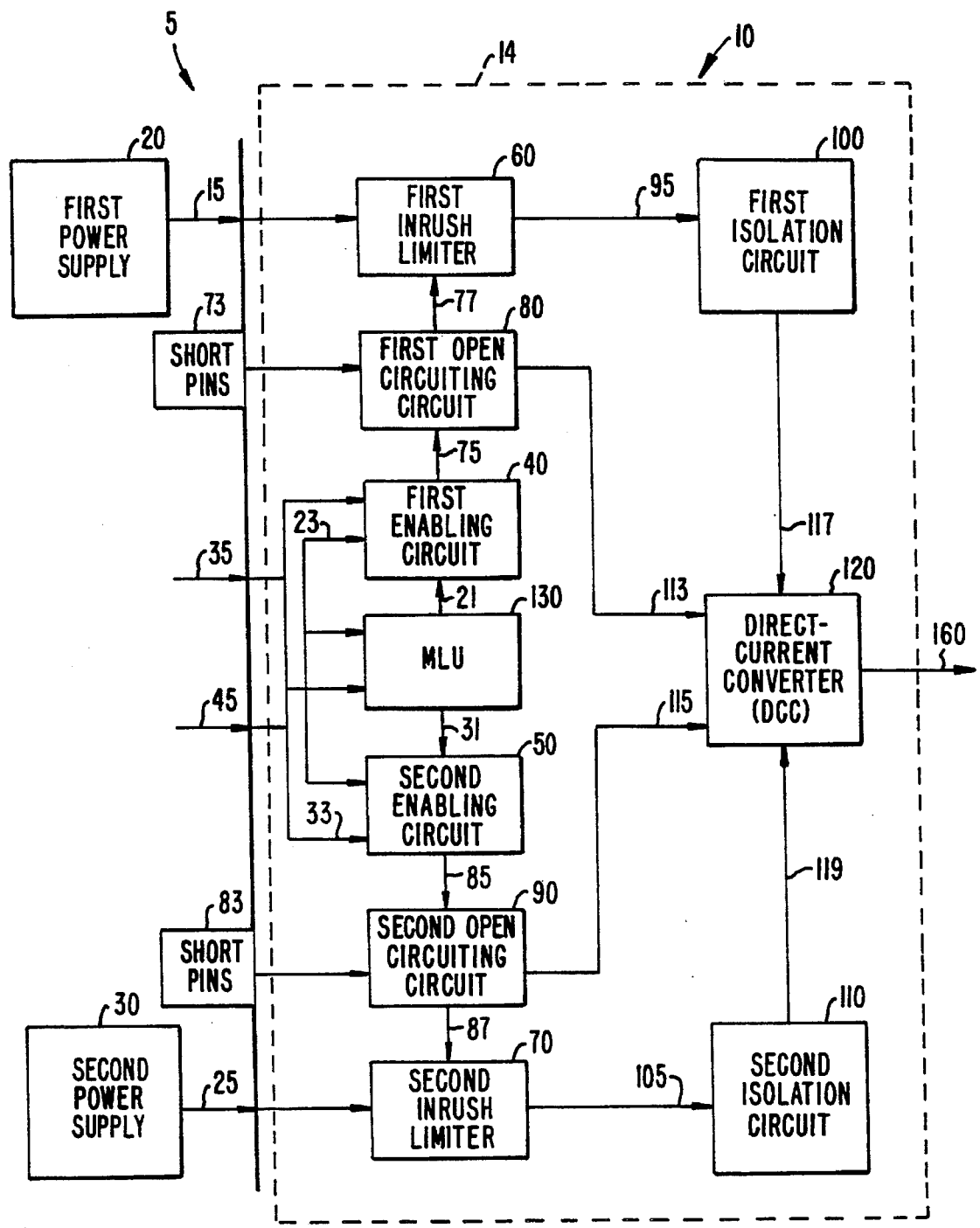
FIG. 1 is a block diagram of a preferred embodiment of the present invention.

FIG. 1 illustrates a Logic Unit (LU) 10 as including a power mixing circuit 14. The LU 10 is a larger unit containing or carrying other functional equipment that is powered by the power mixing circuit 14 such as for example a secondary storage unit (disk). The LU 10 is structured to be removable inserted in a cabinet or like structure that has a receiving connection typically in the form of a backplane 5. Backplane 5 includes first and second power rails 15 and 25, first and second signal lines 35 and 45, and a connector (not shown) that includes first and second pairs of short pins 73 and 83.

A first power supply 20 is coupled to first power rail 15, and a second power supply 30 is coupled to second power rail 25. First power rail 15, second power rail 25, first signal line 35, and second signal line 45 are electrically decoupled from power mixing circuit 14, when LU 10 is physically decoupled from backplane 5.

Power mixing circuit 14 includes a first and a second enabling circuit 40 and 50 respectively coupled to receive signal lines 35 and 45 via signal lines 23 and 33. The first and second enabling circuits 40 and 50 are coupled to a maintenance logic unit (MLU) 130 via signal lines 21 and 31, respectively. First enabling circuit 40 operates to assert a first enabling signal, and second enabling circuit 50 operates to assert a second enabling signal in response to an enabling signal on signal lines 23 or 33, or signal lines 21 or 31, respectively.

A first inrush limiter 60 is coupled to the first power rail 15 by backplane 5, and a second inrush limiter 70 is similarly coupled to the power rail 25—also by the backplane 5. First inrush limiter 60, when enabled, operates to limit the time rate of change of current flowing from first power rail 15, also known as current slew rate. Enabling the second inrush limiter 70 will limit the current slew rate flowing from second power rail 25. In an alternative embodiment, first inrush limiter 60 and second inrush limiter 70 also limit the maximum amount of current flowing from first power rail 15 and second power rail 25, respectively.

A first open-circuiting circuit 80 is coupled to first enabling circuit 40 by signal line 75, to first inrush limiter 60 by signal line 77, and to backplane 5 by the first pair of short pins 73. First open-circuiting circuit 80 is adapted to electrically couple first enabling circuit 40 to first inrush limiter 60 so long as first open-circuiting circuit 80 is coupled to first pair of short pins 73.

A second open-circuiting circuit 90 is coupled to second enabling circuit 50 by signal line 85, to second inrush limiter 70 by signal line 87, and to backplane 5 by a second pair of short pins 83. Second open-circuiting circuit 90 is adapted to electrically couple second enabling circuit 50 to second inrush limiter 80 so long as second open-circuiting circuit 90 is coupled to second pair of short pins 83.

Power mixing circuit 14 also includes a first isolation circuit 100 coupled to first inrush limiter 60 by power line 95, and a second isolation circuit 110 coupled to second inrush limiter 70 by power line 105. First isolation circuit 100 is adapted to isolate first inrush limiter 60 and other circuitry associated with first power supply 20 from power associated with second power supply 30. Second isolation circuit 110 is adapted to isolate second inrush limiter 70 and other circuitry associated with second power supply 30 from power associated with first power supply 20.

A direct-current converter (DCC) 120 is coupled to first open-circuiting circuit 80 by signal line 113, to second open-circuiting circuit 90 by signal line 115, to first isolation circuit 100 by power line 117, and to second isolation circuit 110 by power line 119. DCC 120 is adapted to convert direct current power from power line 117 or from power line 119 into a direct current output 160, when DCC 120 is enabled.

When LU 10 is fully coupled to backplane 5, the first pair and second of short pins 73 and 83 are coupled to the first and the second open circuiting circuits 80 and 90, respectively. In response, the corresponding first and second open-circuiting circuits 80 and 90 will respectively couple the outputs of the first and the second enabling circuit 40 and 50 to an enable input of the first and the second inrush limiters 60 and 70 via signal lines 77 and 87. Similarly, and at substantially the same time, the outputs of the first and the second enabling circuits 40 and 50 to the enable input of the DCC 120 via signal lines 113 and 115. Thereafter, asserting enabling signals on signal lines 35 or 45 will cause the enabling circuits 40, 50 to enable the first and or second inrush limiters 60 and 70 and DCC 120.

In operation, a LU 10 is initially installed into the computer (not shown) coupling it to backplane 5. First power supply 20 supplies power to first power rail 15 and second power supply 30 supplies power to second power rail 25. The computer asserts an enabling signal on signal line 35 enabling LU 10 to draw power from first power rail 15, and the computer asserts an enabling signal on signal line 45 enabling LU 10 to draw power from second power rail 25. More specifically, the enabling signal carried by signal line 35 enables first enabling circuit 40 to generate a first enabling signal, and in similar fashion the enabling signal carried by signal line 45 enables second enabling circuit 50 to generate a second enabling signal.

When first inrush limiter 60 is enabled, the current slew rate from power rail 15 to power line 95 is limited. Similarly, enabling second inrush limiter 70 will limit the current slew rate from power rail 25 to power line 105 also. If first inrush limiter 60 or second inrush limiter 70 are not enabled, power draw from power rail 25 and power rail 35 are respectively inhibited.

When power flows on power line 95, first isolation circuit 100 allows power to flow on power line 117 to DCC 120. When power flows on power line 105, second isolation circuit 110 allows power to flow on power line 119 to DCC 120.

When DCC 120 is enabled, either by the first enabling signal or the second enabling signal, DCC 120 converts power from power rail 117 or power rail 119, without distinguishing where the power is derived from, to a DCC output 160.

The LU 10, so structured, is capable of being removed from the power supplies 20 and 30 in a manner that prevents power surges, arcing and like occurrences that can damage the LU 10, the computer (not shown) to which it attaches, or other associated circuitry, in the following manner. In the normal operating mode, LU 10 is fully coupled to backplane 5. If a user begins to remove LU 10 from backplane 5, initially a first pair of shorting pins 73 are electrically decoupled from first open-circuiting circuit 80 and second pair of shorting pins 83 are electrically decoupled from second open-circuiting circuit 90, meanwhile first inrush limiter 60 remains coupled to first power rail 15 and second inrush limiter 70 remains coupled to second power rail 25. In response to the initial decoupling, first open-circuiting circuit 80 decouples first enabling circuit 40 from first inrush limiter 60 and DCC 120, and second open-circuiting circuit 90 decouples second enabling circuit 50 from second inrush limiter 70 and DCC 120. Without the first or second enabling signals, DCC 120 does not draw power from first power rail 15 or second power rail 25, and the LU 10 is effectively turned off. The user can then safely continue to remove LU 10 from the computer system, thereby decoupling the LU 10 from power rail 15 and power rail 25 and the rest of backplane 5.

Upon insertion of a replacement LU 10, the order of connections is reversed. Power rail 15 is coupled to first inrush limiter 60 and power rail 25 is coupled to second inrush limiter 70, before first pair of shorting pins 73 are coupled to first open-circuiting circuit 80 or second pair of shorting pins 83 are coupled to second open-circuiting circuit 90. Since the respective power rails are coupled to LU 10, before LU 10 begins to draw power, arcing of the power rails to LU 10 is reduced. The function of first pair of shorting pins 73 and second pair of shorting pins 83 are known as "break-first, make-last" connections.

Figure 2:
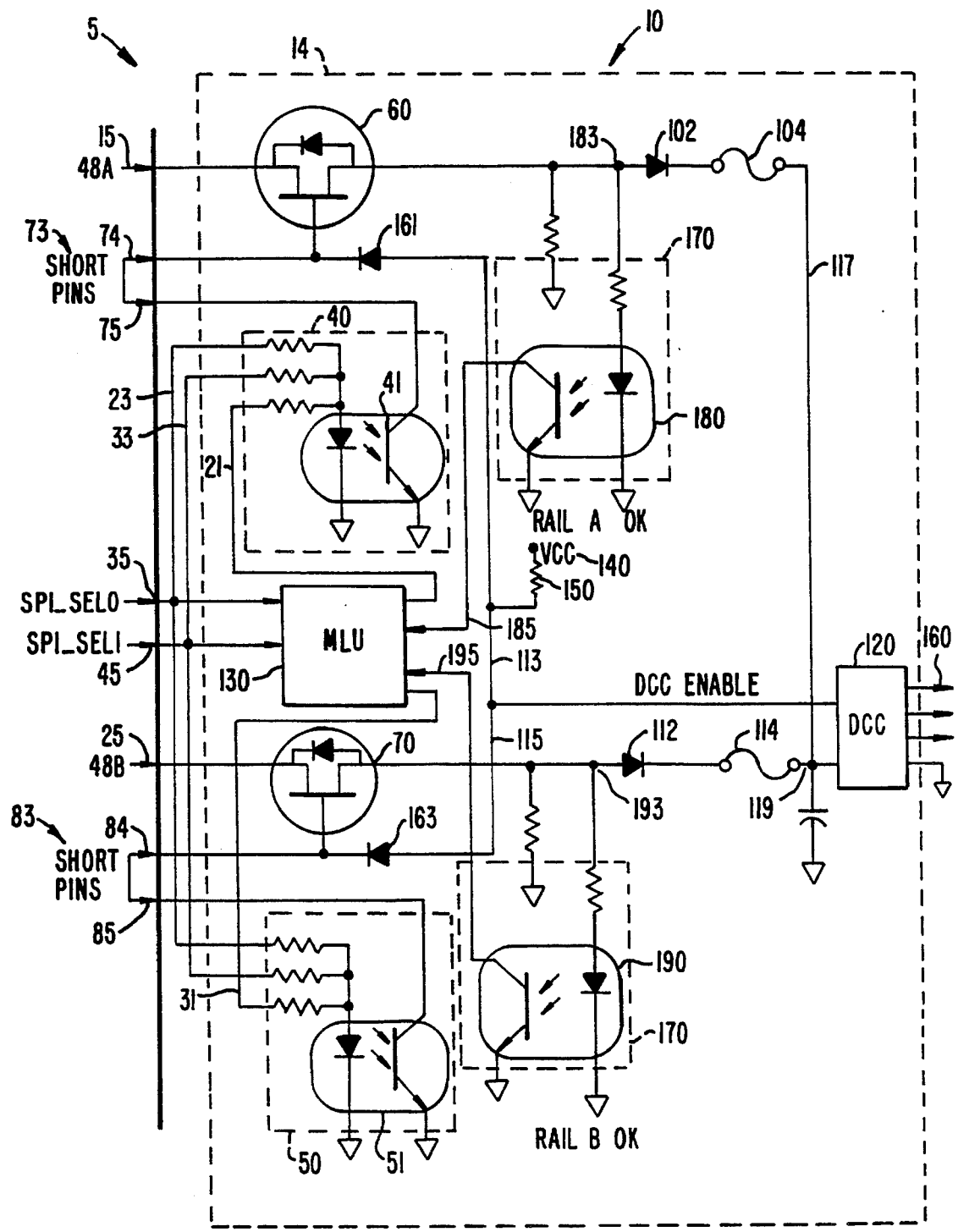
FIG. 2 is a schematic diagram of the circuitry used to implement the preferred embodiment shown in FIG. 1.

FIG. 2 is a schematic diagram of one embodiment of the invention. In FIG. 2, power mixing circuit 14 receives control signals SPI-SEL0 and SPI-SEL1 on signal lines 35 and 45, respectively. Additional control inputs for receiving other control signals in addition to the SPI-SEL signals are not shown. The control signals are standard logic-level signals. The first and second power supplies are typically direct-current sources and can be derived from a battery or from the general power supply. In FIG. 2, a positive voltage convention is used to avoid confusion; however it will be evident to those skilled in this art that the voltage on power rails 15 and 25 may be negative, such as −48 volts. (In fact, FIG. 3, as will be seen, uses a negative voltage convention.)

First pair of short pins 73 are a pair of pins 74 and 75 that are electrically shorted together. Second pair of short pins 83 are a pair of pins 84 and 85 that are electrically shorted together. The physical length of pins 74, 75, 84, and 85 are shorter than the length of the other pins on backplane 5. If LU 10 is partially removed from backplane 5, pins 74, 75, 84, and 85 will loose physical and electrically connection with LU 10 before the remaining pins of backplane 5, such as first power rail 15 or second power rail 25, loose connection with LU 10. As a result, when LU 10 is partially removed from backbone 5, the first enabling signal and second enabling signal are electrically decoupled from other portions of power mixing circuit 14. The break-first, make-last arrangements implemented by the pairs of short pins 83 and 85, together with the associated circuit paths between diodes 161, 163 and opto-isolators 41, 51, form the open circuiting circuits 80, 90 of FIG. 1.

The SPI-SEL0 signal on signal line 35 is coupled to the control input of a first and second enabling circuits 40, 50, and a second to a first logic input of the maintenance logic unit (MLU) 130 by signal line 23. The SPI-SEL1 signal on signal line 45 is also coupled to a control input of first and second enabling circuit 40, 50, and to a second logic input of maintenance logic unit (MLU) 130 by a by signal line 33. As FIG. 2 show, the first and second enabling circuits 40 and 50 are embodied as opto-isolators 41 and 51, respectively.

MLU 130 has first and second power control outputs with the first control output coupled to the control input of the first opto-isolator 41 by a first MLU signal line 21 and the second control output is coupled to the control input of the second opto-isolator 51 by a second MLU signal line 31. Inputs to opto-isolator 41 and 51 are arranged in a wired "OR" arrangement to receive inputs from SPI-SEL0, SPI-SEL1, and MLU 130. Signal lines 23, 33 and 21 serve to enable the first enabling circuit, and signal lines 23, 33, and 31 serve to enable the second enabling circuit.

The first power rail 15 enters the LU 10 through a first current limiter 60, embodied as a power pass transistor, and is coupled to the power input of a DC controller (DCC) 120 via a first protection diode 102 and a first fuse 104, coupled in series. Similarly, a second power rail 25 enters the LU 10 through a second current limiter 70, embodied as a power pass transistor, and is coupled to the input of the DCC 120 via a second protection diode 112 and a second fuse 114, coupled in series.

A DCC 120 enable input is coupled to a collector lead of the first opto-isolator 41 and the gate of the first power pass transistor 60 via a first control diode 161. DCC 120 enable input is also coupled to a collector lead of the second opto-isolator 51, and the gate of the second power pass transistor 70 via a second control diode 163. The enable input of DCC 120 is also connected to a Vcc terminal 140 via pull-up resistor 150. First control diode 161 prevents the first enabling signal from enabling second current limiter 70, and second control diode 163 prevents the second enabling signal from enabling first current limiter 60.

A rail OK signal generation circuit 170 includes a first test opto-isolator 180 having a control input coupled to a first test node 183 located between the output of first power pass transistor 60 and the input of first protection diode 102 and having an output coupled to a first test input of MLU 130 by a first test signal line 185. A second test opto-isolator 190 has a control input coupled a second test node 193 located between the output of second power pass transistor 70 and the input of second protection diode 112 and has an output coupled to a second test input of MLU 130 by a second test signal line 195. Rail OK signal generation circuit 170 is not shown in FIG. 1.

In operation, a system controller (not shown) may assert one, or the other, or both of the SPI-SEL signals. When the SPI-SEL signals are asserted (or either of them), the LU 10 then is enabled to respond to other control signals (not shown, and not relevant here).

Additionally, both power rails 15 and 25 of the LU 10 can be coupled to the DCC 120 by asserting either SPI-SEL signal because the signals are coupled to both control opto-isolators 41 and 51 by first or second signal lines 23 or 33, respectively. Thus, the SPI-SEL signals must each have sufficient high-level drive current to be able to power both control opto-isolators 41 and 51. Once the DCC 120 output voltage stabilizes, the system controller utilizes other control signals (not shown) causing the MLU 130 to assert power control signals on MLU control lines 21 and 31 to opto-isolators 41 and 51 and allowing the negation of the SPI-SEL signals. Accordingly, the SPI-SEL signals perform the dual functions of unit selection and power control.

When both control opto-isolators 41 and 51 conduct, the voltage level at the gates of the first and second power pass transistors 60 and 70 are low due to the voltage drop across the pull-up resistor 150. This enables first and second power pass transistors 60 and 70 to conduct power from the power rails 15 and 25 to the DCC 120.

Alternatively, when the control signal on the first MLU control line to the opto-isolator 41 is negated, for example, the first opto-isolator 41 will cease conducting, and the gate of the first power-pass transistor 60 will be pulled to about Vcc. As a result, the first power pass transistor 60 will cease conduction and power will not be drawn from first power rail 15. However, if the second opto-isolator 51 continues to conduct, the gate voltage of second power pass transistor 70 is held low, allowing power to be drawn from second power rail 25. Control diode 161 ensures conduction of second opto-isolator 51 does not pull the gate voltage of first power pass transistor 60 low. (Control diode 163 performs the same function to prevent turning on the second power pass transistor 70 by conduction of opto-isolator 41.)

The function of the protection diodes 102 and 112 will now be described. Since power line 117 and power line 119 are coupled before DCC 120, so long as power line 117 and power line 119 are equally powered, protection diodes 102 and 112 are not needed. However in the case where power is not being drawn from one of the power rails, power rail 15 for example, protection diode 102 ensures, that power from power line 119 does not create a reverse power flow. Conversely, protection diode 112 ensures that power from power line 117 does not create a reverse power flow.

Protection fuses 104 and 114 ensures that a limited amount of current is drawn from power rails 15 and 20, in the case of a spurious short circuit or other malfunction in DCC 120. In another embodiment, protection fuses 104 and 114 can be located between power rail 15 and first inrush limiter 60 and between 25 and second inrush limiter 70, respectively, in order to protect the circuitry of power mixing circuit 14.

The rail OK signal generation circuit 170 permits MLU 130 to monitor the status of power being drawn from first power rail 15 and second power rail 25.

When LU 10 is in the process of being removed from backplane 5, pins 74 and 75, (and 84, 85) being shorter than the rest (e.g., those that communicate the power rails 15 and 25 to the LU 10) will break electrical connection between first enabling circuit 40 and power-pass transistor 60 before power-pass transistor 60 breaks electrical connection to power rail 15. Similarly, pins 84 and 85 will break the electrical connection between second enabling circuit 50 and power-pass transistor 70, before power-pass transistor 70 breaks electrical connection to power rail 25. Breaking these electrical connections removes enabling signals from DCC 120. Thus before LU 10 is fully withdrawn from backplane 5, and more particularly from power rail 15 and power rail 25, the LU 10 is already powered down, causing fewer power related problems.

Figure 3:
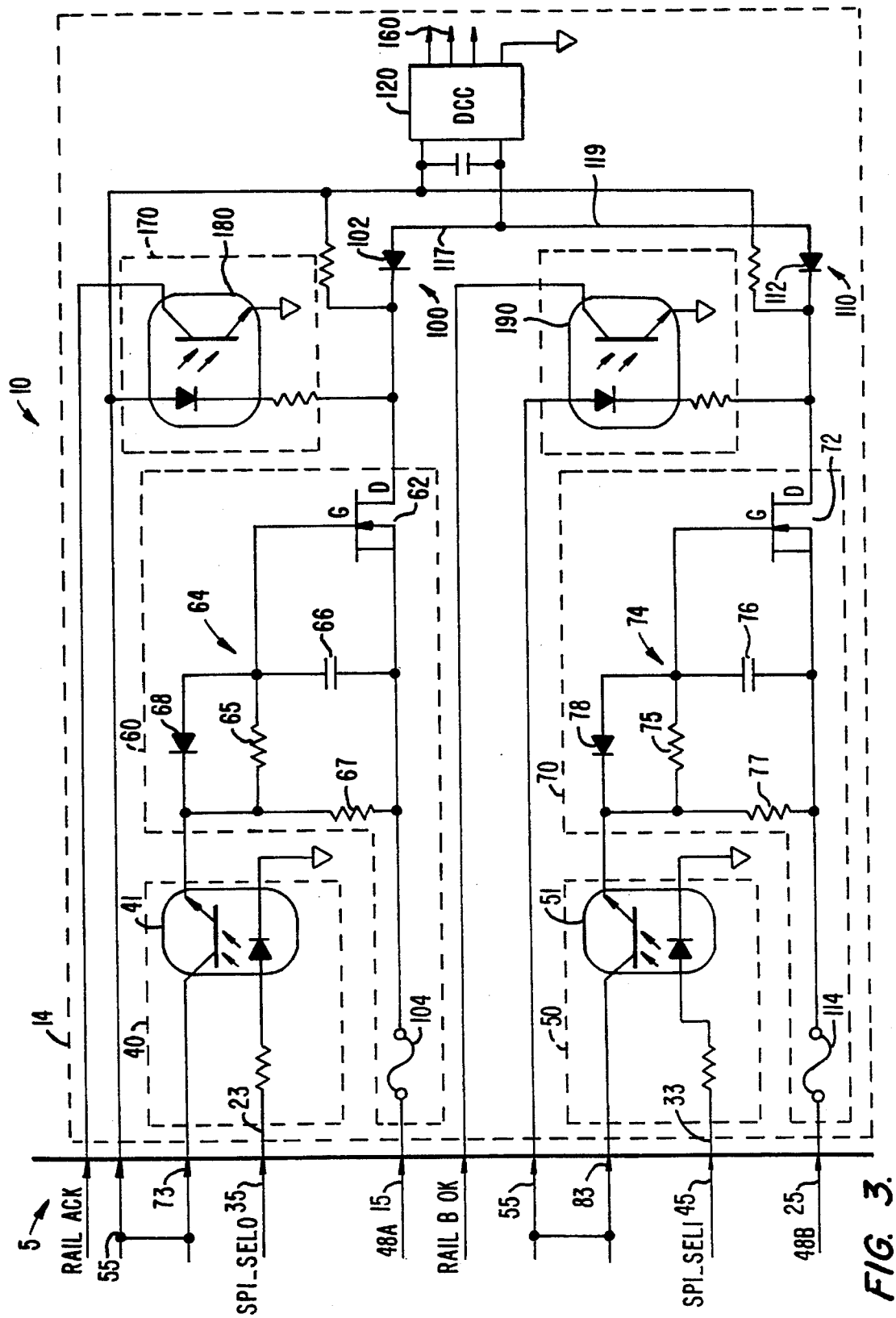
FIG. 3 is a schematic diagram to illustrate another embodiment of the present invention.

FIG. 3 is a schematic diagram of another embodiment of the present invention. A Logic Unit (LU) 10 including a power mixing circuit 14 is coupled to a backplane 5. Backplane 5 includes a first power rail 15, a second power rail 25, a first signal line 35, a power return rail 55, a second signal line 45, and a connector (not shown) that includes a first shorting pin 73, and a second shorting pins 83.

In FIG. 3 a negative power convention is used wherein first power rail 15 and second power rail 25 provide a negative voltage, preferably from −40 to −60 volts.

First shorting pin 73 and second shorting pin 83 are coupled to power return rail 55 on backplane 5 in a "make-last, break-first" arrangement. Accordingly, first and second shorting pins 73 and 83 operate to couple first and second enabling circuits 40 and 50 to power return rail 55 only after LU 10 is coupled to first and second power rails 15 and 25. Conversely, the first and second shorting pins 73 and 83 will operate to decouple first and second enabling circuits 40 and 50 from power return rail 55 before LU 10 is decoupled from first and second power rails 15 and 25.

In the embodiment shown in FIG. 3, the SPI_SEL0 and SPI_SEL1 signals carried by the signal lines 35 and 45 are provided as in the embodiment in FIG. 2. The MLU is not shown in this embodiment. A first system enabling signal is asserted when a signal appears on signal line 23 from SPI_SEL0, and a second system enabling signal is asserted when a signal appears on signal line 33 from SPI_SEL1.

First and second enabling circuits 40 and 50 are adapted to generate a first and second enabling signal, when first and second enabling circuits 40 and 50 are coupled to power return rail 55, and when the first system enabling signal or the second system enabling signal are respectively asserted. In this embodiment, first and second enabling circuits 40 and 50 are opto-isolators 41 and 51.

First and second inrush limiters 60 and 70 include fuses 104 and 114, metal oxide semiconductor field effect transistors (MOSFETs) 62 and 72, and gate voltage limiting circuits 64 and 74, respectively. Fuses 104 and 114 are adapted to limit the peak current flowing from first and second power rails 15 and 25, respectively. MOSFETs 62 and 72 are adapted to allow a first and a second current to be drawn from power rails 15 and 25, in response to a respective gate voltage on MOSFETs 62 and 72. First and second gate voltage limiting circuits 64 and 72 are adapted to provide an exponentially increasing gate voltage to MOSFETs 62 and 72 in response to the first and the second enabling signals, respectively.

First gate voltage limiting circuit 64 includes a resistor 65 and a capacitor 66 which together define the exponential rise-time of the gate voltage when LU 10 is initially installed into the computer. First gate voltage limiting circuit 64 also includes resistor 67 and diode 68 which affect the fall-time of the gate voltage when LU 10 is removed from the computer. Second gate voltage limiting circuit 64 operates in the same manner as first gate voltage limiting circuit 64, with resistors 75 and 77, capacitors 76, and diode 78.

First and second isolation circuits 100 and 110 are coupled to the first and second current limiters 60 and 70, and operate to electrically isolate the two power rails 15, 25 in the same manner as do diodes 102 and 112, respectively, of FIG. 2.

DCC 120 is coupled to first and second diodes 102 and 112 and to the power return rail 55, and DCC 120 adapted to convert current from power rail 117 to a direct current output 160 and adapted to convert current from power rail 119 to a direct current output 160.

Rail OK circuit 170 is similar to the embodiment of the rail OK circuit 170 in FIG. 2.

In operation, because of the "break-first, make-last" arrangement of first and second shorting pins 73 and 74, first and second enabling circuits 40 and 50 cannot generate the first or second enabling signals, until after LU 10 is fully coupled to first and second power rails 15 and 25.

After LU 10 is fully coupled to backplane 5, first and second enabling circuits 40 and 50 are coupled to power return rail 55. Then in response to a first and/or second system enabling signal, first and/or second enabling circuits 40 and 60 generate a first and/or a second enabling signal, respectively. In response to the first and/or second enabling signals, the gate voltage of MOSFETS 62 and 72 rise exponentially, thus MOSFETS 62 and 72 conduct current exponentially. First and/or second current limiters thus generate a first and/or a second current.

The first and/or second current pass through diodes 102 and/or 112 and are input into DCC 120, where a direct-current output is produced.

Upon removal of LU 10 from the computer system, first and second shorting pins 73 and 74, decouple first and second enabling circuits 40 and 50 from power return rail 55, respectively, therefore, first and second enabling signals are deasserted. Once the enabling signals are deasserted, the gate voltages of MOSFETs 62 and 72 fall rapidly, thus MOSFETs 62 and 72 inhibit current flow. First and second current limiters 60 and 70 thus inhibit current from being drawn from power rails 15 and 25, respectively. Once current draw from power rail 15 and 25 is removed, LU 10 can safely be removed from the computer system.

In the foregoing specification, the invention has been described with reference to a specific exemplary embodiments thereof. It will, however, be evident that various modifications and changes may be made thereunto without departing from the broader spirit and scope of the invention as set forth in the claims.

Many changes or modifications are readily envisioned. For example, changing the number of power sources and power rails coupled to a LU, using different voltage levels for the different power supplies, and using a power pass transistor for the first and second open-circuiting circuits with the shorting signal applied to the respective gates, are included within other embodiments of the present invention. The specification and drawings are, accordingly, to be regarded in an illustrative rather than in a restrictive sense.

What is claimed is:

1. A power mixing apparatus coupled to receive first and second power rails to produce therefrom a direct current output, the power mixing apparatus comprising:

connection means for removably coupling the power mixing apparatus to the first and second power rails, the connection means including open circuiting pins for completing a circuit path when the power mixing apparatus is coupled to the first and second power rails;

means for producing an enabling signal coupled to the open circuiting pins;

a pair of current limiters each respectively coupled to receive corresponding ones of the first and second power rails and to the open circuiting pins to receive the enabling signal to produce first and second currents from a one and another one of the pair of power rails, respectively, when the circuit path is complete; and a converter coupled to receive the first and second currents for producing the direct-current output.

2. The power mixing apparatus of claim 1, wherein the converter operates to produce the direct-current output from either or both of the first and second currents.

3. The power mixing apparatus of claim 2, wherein the enabling signal includes first and second enabling signals that, when present, respectively operate to cause the first and second currents to be produced.

4. The power mixing apparatus of claim 2, wherein the enabling signal operates to selectively cause the first current or the second current or both to be produced.

5. The power mixing apparatus of claim 4, including means for providing an indication of presence of the first current or the second current.

6. Apparatus coupled to receive a power rail to produce therefrom a direct current output, comprising:
   a connection for removably coupling the power rail to the apparatus, the connection including open circuiting pins for completing a circuit path when the apparatus is coupled to the power rail;
   means for producing an enabling signal coupled to the open circuiting pins;
   a current limiter coupled to receive the power rail and to the open circuiting pins to receive the enabling signal through the open circuiting pins to produce a current from the power rail when the circuit path is complete; and
   a converter coupled to receive the current for producing the direct-current output.

7. A power mixing apparatus coupled to a backplane, for selectively mixing current from a first power rail and current from a second power rail, the power mixing apparatus comprising:
   a first enabling circuit adapted to provide a first enabling signal;
   a second enabling circuit adapted to provide a second enabling signal;
   a first inrush limiter, coupled to the first power rail, adapted to output a first current in response to said first enabling signal;
   a second inrush limiter, coupled to the second power rail, adapted to output a second current in response to said second enabling signal;
   a first open-circuiting circuit, coupled to said first enabling circuit and to said first inrush limiter, adapted to electrically decouple said first enabling circuit from said first inrush limiter when said first open-circuiting circuit is open-circuited;
   a second open-circuiting circuit, coupled to said second enabling circuit and to said second inrush limiter, adapted to electrically decouple said second enabling circuit from said second inrush limiter when said second open-circuiting circuit is open-circuited;
   a first isolation circuit, coupled to said first inrush limiter, adapted to isolate said first inrush limiter from said second current;
   a second isolation circuit, coupled to said second inrush limiter, adapted to isolate said second inrush limiter from said first current; and
   a direct-current converter, coupled to said first open-circuiting circuit, to said second open-circuiting circuit, to said first isolation circuit, and to said second isolation circuit, adapted to convert said first current and said second current to a direct-current output in response to said first enabling signal and in response to said second enabling signal.

8. The power mixing apparatus of claim 7,
   wherein said first inrush limiter includes a first metal oxide silicon field effect transistor, said first field effect transistor having a source coupled to said first power rail, a drain coupled to said first isolating circuit, and a gate coupled to said first open-circuiting circuit and to said direct-current converter.

9. The power mixing apparatus of claim 7,
   wherein said first isolation circuit includes a first diode and a first fuse coupled in series.

10. The power mixing apparatus of claim 7,
    wherein said first enabling circuit includes a first plurality of inputs and a first opto-isolator, said first opto-isolator adapted to provide said first enabling signal in response to one of said first plurality of inputs being enabled.

11. The power mixing apparatus of claim 7,
    wherein said first open-circuiting circuit is adapted to be open-circuited when the power mixing apparatus is partially physically decoupled from the backplane; and
    wherein the first power rail is not decoupled from said first inrush limiter when the power mixing apparatus is partially physically decoupled from the backplane.

12. A power mixing apparatus coupled to a backplane, for mixing current from a first power rail and current from a second power rail, the power mixing apparatus comprising:
    a first enabling circuit adapted to provide a first enabling signal;
    a second enabling circuit adapted to provide a second enabling signal;
    a first current limiter, coupled to the first power rail adapted to pass a first current from the first power rail in response to said first enabling signal, and to limit said first current;
    a second current limiter, coupled to the second power rail, adapted to pass a second current from the second direct-current in response to said second enabling signal, and to limit said second current;
    a first pair of pins, coupled to said first enabling circuit and to the first current limiter, adapted to electrically couple said first enabling circuit to said first current limiter, and to adapted to electrically decouple said first enabling circuit from said first current limiter when said first pair of pins is open-circuited;
    a second pair of pins, coupled to said second enabling circuit and to said second current limiter, adapted to electrically couple said second enabling circuit to said second current limiter, and adapted to electrically decouple said second enabling circuit from said second current limiter when said second pair of pins is open-circuited;
    a first protection circuit, coupled to said first inrush limiter, adapted to protect the first power rail from a reverse current flow;
    a second protection circuit, coupled to said second inrush limiter, adapted to protect the second power rail from a reverse current flow; and
    a direct-current converter, coupled to receive and convert said first current and said second current into a direct-current output in response to said first enabling signal and to said second enabling signal.

13. The power mixing apparatus of claim 12, wherein the direct-current converter operates to convert said first current into the direct-current output in response to said first enabling signal.

14. The power mixing apparatus of claim 12, wherein the direct-current converter operates to convert said second current into the direct-current output in response to said second enabling signal.

15. The power mixing apparatus of claim 12, wherein said first and second pair of pins are adapted to be open-circuited when the power mixing apparatus is partially physically decoupled from the backplane.

16. The power mixing apparatus of claim 15, wherein the first and second power rails are not decoupled from said first and second current limiters, respectively, when the power mixing apparatus is partially physically decoupled from the backplane.

17. The power mixing apparatus of claim 12, wherein said first and second protection circuits each include diodes.

18. The power mixing apparatus of claim 12, wherein said first and second enabling circuits each include first and second opto-isolators, respectively, said first and second opto-isolators each respectively adapted to provide said first and second enabling signals.

19. A power mixing apparatus coupled to a backplane, for selectively mixing current from a first power rail and current from a second power rail, the power mixing apparatus comprising:

a first shorting pin, adapted to couple an input to a power return rail when the power mixing apparatus is fully coupled to the backplane;

a second shorting pin, adapted to couple an input to a power return rail when the power mixing apparatus is fully coupled to the backplane;

a first enabling circuit, coupled to said input of said first shorting pin, adapted to generate a first enabling signal in response to said first enabling circuit being coupled to said power return rail and in response to a first system enabling signal;

a second enabling circuit, coupled to said input of said second shorting pin, adapted to generate a second enabling signal in response to said second enabling circuit being coupled to said power return rail and in response to a second system enabling signal;

a first current limiter, coupled to the first power rail and to said first enabling circuit, adapted to limit a first current drawn from the first power rail in response to said first enabling signal;

a second current limiter, coupled to the second power rail and to said second enabling circuit, adapted to limit a second current drawn from the second power rail in response to said second enabling signal;

a first isolation circuit, coupled to said first current limiter, adapted to isolate said first current limiter from said second current;

a second isolation circuit, coupled to said second current limiter, adapted to isolate said second current limiter from said first current; and a direct-current converter, coupled to said first isolation circuit, to said second isolation circuit, and to said power return rail, adapted to convert said first current to a direct current output, and adapted to convert said second current to said direct current output.

20. The power mixing apparatus of claim 19, wherein said first enabling circuit includes a first opto-isolator.

21. The power mixing apparatus of claim 19, wherein said first current limiter further comprises:

a fuse, coupled to said first power rail, adapted to limit said first current;

a metal oxide semiconductor field effect transistor (MOSFET) having a source coupled to said fuse, and a drain coupled to said first isolation circuit; and a gate voltage limiting circuit, coupled to said first enabling circuit and to said MOSFET, adapted to limit a voltage at a gate of said MOSFET in response to said first enabling signal.

* * * * *